United States Patent
Xu et al.

(10) Patent No.: US 12,261,319 B2
(45) Date of Patent: Mar. 25, 2025

(54) BATTERY MODULE, BATTERY PACK, ELECTRICAL APPARATUS, AND MANUFACTURING METHOD AND MANUFACTURING DEVICE OF BATTERY MODULE

(71) Applicant: CONTEMPORARY AMPEREX TECHNOLOGY (HONG KONG) LIMITED, Hong Kong (CN)

(72) Inventors: Xiaofu Xu, Ningde (CN); Yonghuang Ye, Ningde (CN); Qian Liu, Ningde (CN); Haizu Jin, Ningde (CN); Chengdu Liang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 460 days.

(21) Appl. No.: 17/887,644

(22) Filed: Aug. 15, 2022

(65) Prior Publication Data
US 2022/0393291 A1 Dec. 8, 2022

Related U.S. Application Data

(63) Continuation of application No. PCT/CN2020/139181, filed on Dec. 24, 2020.

(51) Int. Cl.
| | | |
|---|---|---|
| *H01M 50/267* | (2021.01) | |
| *H01M 4/583* | (2010.01) | |
| *H01M 10/04* | (2006.01) | |
| *H01M 50/209* | (2021.01) | |
| *H01M 50/51* | (2021.01) | |
| *H01M 4/02* | (2006.01) | |

(52) U.S. Cl.
CPC ......... *H01M 50/267* (2021.01); *H01M 4/583* (2013.01); *H01M 10/04* (2013.01);
(Continued)

(58) Field of Classification Search
CPC .. H01M 50/267; H01M 50/209; H01M 50/51; H01M 4/583; H01M 10/04
See application file for complete search history.

(56) References Cited

U.S. PATENT DOCUMENTS

| | | | | |
|---|---|---|---|---|
| 2005/0233220 A1* | 10/2005 | Gozdz | ............... | H01M 10/0525 |
| | | | | 429/231.95 |
| 2010/0225325 A1* | 9/2010 | Christensen | ....... | G01R 31/3842 |
| | | | | 324/426 |
| 2016/0336624 A1 | 11/2016 | Gu et al. | | |

FOREIGN PATENT DOCUMENTS

| | | |
|---|---|---|
| CN | 208674305 U | 3/2019 |
| CN | 110048151 A | 7/2019 |

(Continued)

OTHER PUBLICATIONS

Examination report dated May 8, 2024 received in Indian Patent Application No. 202217029831.

(Continued)

*Primary Examiner* — Wyatt P McConnell
(74) *Attorney, Agent, or Firm* — Scully, Scott, Murphy & Presser, P.C.

(57) ABSTRACT

The present application relates to a battery module, including a first-type battery cell and a second-type battery cell electrically connected at least in series, the first-type battery cell and the second-type battery cell are battery cells of different chemical systems, the first-type battery cell includes N first battery cell(s), the second-type battery cell includes M second battery cell(s); the first battery cell includes a first negative electrode plate, the second battery cell includes a second negative electrode plate, a ratio of a conductivity of an electrolyte solution (25° C.) of the first battery cell to a coating mass per unit area of the first negative electrode plate is denoted as M1, and a ratio of a conductivity of an electrolyte solution (25° C.) of the second (Continued)

battery cell to a coating mass per unit area of the second negative electrode plate is denoted as M2, M1>M2, and $0.08 \leq M1 \leq 11$, $0.03 \leq M2 \leq 4.62$.

10 Claims, 4 Drawing Sheets

(52) U.S. Cl.
CPC ......... *H01M 50/209* (2021.01); *H01M 50/51* (2021.01); *H01M 2004/021* (2013.01); *H01M 2004/027* (2013.01); *H01M 2220/20* (2013.01)

(56) References Cited

FOREIGN PATENT DOCUMENTS

| | | |
|---|---|---|
| CN | 111761335 A | 10/2020 |
| JP | 2013145759 A | 7/2013 |
| WO | 2010101830 A1 | 9/2010 |

OTHER PUBLICATIONS

International Search Report dated Sep. 24, 2021 issued in PCT/CN2020/139181.
Extended European Search Report dated Jan. 26, 2023 received in European Patent Application No. EP 20946532.7.

\* cited by examiner

BATTERY MODULE, BATTERY PACK, ELECTRICAL APPARATUS, AND MANUFACTURING METHOD AND MANUFACTURING DEVICE OF BATTERY MODULE

CROSS-REFERENCE TO RELATED APPLICATIONS

This application is a continuation of International Application No. PCT/CN2020/139181, filed on Dec. 24, 2020, the disclosure of which is hereby incorporated by reference in its entirety.

TECHNICAL FIELD

The present application relates to the technical field of energy storage devices, in particular, to a battery module, a battery pack, an electrical apparatus, and a manufacturing method and manufacturing device of a battery module.

BACKGROUND

A secondary battery has advantages of small size, high energy density, high power density, multiple recycling times and long storage time. It has been widely used in some electronic devices, electric vehicles, electric toys and electric devices, for example, mobile phones, notebook computers, battery carts, electric cars, electric airplanes, electric ships, electric toy cars, electric toy ships, electric toy airplanes, electric tools, or the like.

The secondary battery is used as a power drive power supply of a new energy vehicle or a large capacity storage unit of an energy storage power station, and it is necessary to connect a plurality of battery cells in series/parallel to obtain a battery module, a battery pack or a system electrical cabinet. In order to improve the safety of the secondary battery, a technical solution of connecting the plurality of battery cells of different chemical systems to form a battery module is proposed. Among them, one type of battery cell is, for example, a ternary-based battery cell containing lithium N, C, M oxide metal oxide with high energy density, and another type of battery cell is, for example, a lithium iron phosphate battery cell with high safety.

However, battery cells of different chemical systems have significant differences in their energy density, charging and discharging characteristics and high and low temperature characteristics. How to match the battery cells of different chemical systems is an urgent technical problem to be solved in a field of secondary batteries so that the battery module can implement fast charging and discharging capabilities as well as higher safety.

SUMMARY

In the prior art, it only records that multiple types of battery cells are connected, but does not record a reasonable range of design key parameters of a battery module related to a charging strategy. At the same time, there is no record or disclosure on how to implement safety of a fast charging and discharging process of different types of the battery cells.

The present application is completed in view of the above problems existing in the prior art, and it aims to provide a battery module, which can ensure that the battery cells with different charging and discharging characteristics can uniformly perform a fast charging and discharging, and lithium plating and other safety problems are not prone to occur during a fast charging process by matching and designing each parameter of different types of the battery cells.

A first aspect of the present application provides a battery module, including a first-type battery cell and a second-type battery cell at least electrically connected in series, the first-type battery cell and the second-type battery cell are battery cells of different chemical systems, the first-type battery cell includes N first battery cell(s), the second-type battery cell includes M second battery cell(s), N and M are positive integers, the first battery cell includes a first negative electrode plate, the second battery cell includes a second negative electrode plate, a ratio of a conductivity of an electrolyte solution (25° C.) of the first battery cell to a coating mass per unit area of the first negative electrode plate is denoted as M1, a ratio of a conductivity of an electrolyte solution (25° C.) of the second battery cell to a coating mass per unit area of the second negative electrode plate is denoted as M2, where a unit of the conductivity of the electrolyte solution is mS/cm, a unit of the coating mass per unit area is $mg/cm^2$; and M1 and M2 satisfy: M1>M2, and 0.08≤M1≤11, 0.03≤M2≤4.62.

Optionally, 0.33≤M1≤6.42, 0.17≤M2≤2.57. Further optionally, 0.63≤M1≤1.94, 0.63≤M2≤1.1.

Optionally, a state of charge-open circuit voltage (SOC-OCV) curve of the first battery cell satisfies at least one of the following conditions: (1) in an interval of 5%-95% SOC, a slope k1 of the SOC-OCV curve of the first battery cell is ≤5 mV/% SOC; (2) in the SOC-OCV curve of the first battery cell, there is at least a flat curve with a span not less than 10% SOC and the slope k1≤5 mV/% SOC.

Optionally, a state of charge-open circuit voltage (SOC-OCV) curve of the second battery cell satisfies at least one of the following conditions: (1) in the interval of 5%-95% SOC, a slope k2 of the SOC-OCV curve of the second battery cell is >5 mV/% SOC, optionally, k2≥6 mV % SOC, and further optionally, k2≥9 mV/% SOC; (2) in the SOC-OCV curve of the second battery cell, there is at least a curve with a span not less than 10% SOC and the slope k2>5 mV/% SOC.

Optionally, a compacted density of the first negative electrode plate is PD1, and a compacted density of the second negative electrode plate is PD2, where PD1<PD2, and 0.5≤PD1≤3, 0.5≤PD2≤3, and a unit is $g/cm^3$; optionally, 1≤PD1≤2, 1≤PD2≤2; further optionally, 1.2≤PD1≤1.7, 1.2≤PD2≤1.7.

Optionally, a coating mass per unit area of the first negative electrode plate is CW1, and a coating mass per unit area of the second negative electrode plate is CW2, where 6.49≤CW1≤17, 4.54≤CW2≤25.51, and a unit is: $mg/cm^2$. Optionally, 7.79≤CW1≤11.69, 6.23≤CW2≤15.19. Further optionally, 9.09≤CW1≤11.04, 7.73≤CW2≤12.69. Still further optionally, CW1<CW2.

Optionally, a negative active substance of the first negative electrical sheet and a negative active substance of the second negative electrical sheet can be independently selected from one or more of artificial graphite, natural graphite, soft carbon, hard carbon, silicon-based material, tin-based material and lithium titanate.

Optionally, a ratio of the number N of the first battery cell to the number M of the second battery cell is 0.1~50, optionally 0.3~30, and further optionally 0.5~10.

A second aspect of the present application provides a battery pack, including the battery module according to the above first aspect.

A third aspect of the present application provides a power consumption apparatus, including the battery module according to the above first aspect or the battery pack according to the above second aspect, and the battery module or the battery pack can serve as a power supply or an energy storage unit of the power consumption apparatus.

A fourth aspect of the present application provides a manufacturing method of a battery module, including the following steps: obtaining a first-type battery cell and a second-type battery cell, the first-type battery cell and the second-type battery cell are battery cells of different chemical systems, the first-type battery cell includes N first battery cell(s), the second-type battery cell includes M second battery cell(s), N and M are positive integers, the first battery cell includes a first negative electrode plate, the second battery cell includes a second negative electrode plate, a ratio of a conductivity of an electrolyte solution (25° C.) of the first battery cell to a coating mass per unit area of the first negative electrode plate is denoted as M1, a ratio of a conductivity of an electrolyte solution (25° C.) of the second battery cell to a coating mass per unit area of the second negative electrode plate is denoted as M2, where a unit of the conductivity of the electrolyte solution is mS/cm, a unit of the coating mass per unit area is mg/cm$^2$; and M1 and M2 satisfy: M1>M2, and 0.08≤M1≤11, 0.03≤M2≤4.62; and the first-type battery cell and the second-type battery cell are electrically connected at least in series to form the battery module according to the above first aspect.

A fifth aspect of the present application provides a manufacturing device of a battery module, including: a clamping arm unit, configured to obtain a first-type battery cell and a second-type battery cell, the first-type battery cell and the second-type battery cell are battery cells of different chemical systems, the first-type battery cell includes N first battery cell(s), the second-type battery cell comprises M second battery cell(s), N and M are positive integers, the first battery cell includes a first negative electrode plate, the second battery cell includes a second negative electrode plate, a ratio of a conductivity of an electrolyte solution (25° C.) of the first battery cell to a coating mass per unit area of the first negative electrode plate is denoted as M1, a ratio of a conductivity of an electrolyte solution (25° C.) of the second battery cell to a coating mass per unit area of the second negative electrode plate is denoted as M2, where a unit of the conductivity of the electrolyte solution is mS/cm and a unit of the coating mass per unit area is mg/cm$^2$; and M1 and M2 satisfy: M1>M2, and 0.08≤M1≤11, 0.03≤M2≤4.62; an assembling unit, configured to electrically connect the first-type battery cell and the second-type battery cell at least in series to form the battery module according to the above first aspect; and a control unit, configured to control the clamping arm unit and the assembling unit.

Technical Effect

In the present application, the battery module includes a first-type battery cell and a second-type battery cell connected at least in series with different chemical systems, and by optimizing and designing a ratio of a conductivity of an electrolyte solution of the first-type battery cell to a coating mass per unit area of the first negative electrode plate and a ratio of a conductivity of an electrolyte solution of the second-type battery cell to a coating mass per unit area of the second negative electrode plate, it may ensure that the lithium plating window of the first-type battery cell is matched with that of the second-type battery cell, so that the battery module containing battery cells of different chemical systems can have good fast charging and discharging capabilities and is not prone to lithium plating during a fast charging process.

A battery pack and a device of the present application include the battery module, and thus at least have the same technical advantages as the battery module.

Figure 1:
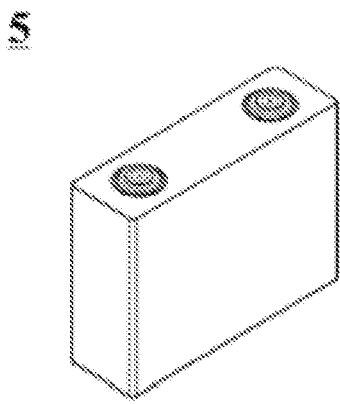
FIG. 1 is a schematic diagram showing an example of a battery cell of the present application.

LABEL DESCRIPTION 5, 5a, 5b battery cells
51 housing
52 electrode assembly
53 cover plate
4 battery module
1 battery pack
2 upper box body
3 lower box body

DESCRIPTION OF EMBODIMENTS

A "range" disclosed herein is defined in the form of a lower limit and an upper limit. A given range is defined by selecting a lower limit and an upper limit, and the selected lower limit and upper limit define a boundary of a particular range. The range defined in this manner may include or may not include end value(s), and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of combination of these numerical values. In addition, when a certain parameter is expressed as an integer ≥2, it is equivalent to disclosing that the parameter is, for example, an integer of 2, 3, 4, 5, 6, 7, 8, 9, 10, 11, 12, or the like.

In the present application, unless otherwise specified, all embodiments and preferred embodiments mentioned herein may be combined with each other to form a new technical solution.

In the present application, unless otherwise specified, all technical features and preferred features mentioned herein may be combined with each other to form a new technical solution.

In the present application, unless otherwise specified, all steps mentioned herein may be performed sequentially or randomly, but preferably, performed sequentially. For example, a method includes steps (a) and (b), which means that the method may include steps (a) and (b) performed sequentially, or may include steps (b) and (a) performed sequentially. For example, the method mentioned may further include step (c), which means that step (c) may be added to the method in any order, for example, the method may include steps (a), (b) and (c), may include steps (a), (c) and (b), may include steps (c), (a) and (b), or the like.

In the present application, unless otherwise specified, "comprising" and "containing" mentioned herein are open-ended or closed-ended. For example, the "comprising" and "containing" may mean that other components that are not listed may further be comprised or contained, or only listed components may be comprised or contained.

In the description herein, it should be noted that, unless otherwise specified, "no more than" and "no less than" include the end value, and "more" in "one or more" means two or more.

In the description herein, unless otherwise specified, the term "or" is inclusive. For example, the phrase "A or B" means "A, B or both A and B". More particularly, a condition "A or B" is satisfied by any one of the following conditions: A is true (or present) and B is false (or not present); A is false (or not present) and B is true (or present); or both A and B are true (or present).

A secondary battery is used as a power drive power supply of a new energy vehicle or a large capacity storage unit of an energy storage power station, in addition to having higher energy density, people's requirements for a charging speed of the secondary battery are also increasing.

In order to implement a fast charging of the secondary battery, a stepped charging method is commonly used at present. A charging curve of the above stepped charging usually consists of a plurality of steps. In each step, the charging is continued with a constant current for a certain period of time, and then at the next critical point, the charging current increases, and the charging is continued to be performed with a constant current at the next step. The stepped charging is generally regulated according to a lithium plating window (reflected in maximum charging currents corresponding to a battery cell under different SOCs) corresponding to a negative electrode plate of the secondary battery.

However, when a battery module includes a plurality of battery cells of different chemical systems connected in series and charged with the same current, since charging and discharging characteristics of the battery cells of different chemical systems are significantly different, how to implement a uniform fast charging and discharging of the battery cells of different chemical systems as well as higher safety has become a technical problem.

[Battery Cell]

In the present application, a "battery cell" refers to a cell capable of charging and discharging independently. A battery cell includes a positive electrode plate, a negative electrode plate, a separator, an electrolyte solution, an outer package for packaging the positive electrode plate, the negative electrode plate, the separator, the electrolyte solution, or the like. In the present application, types and shapes of the battery cell are not specifically restricted, which may be a pouch battery cell, a cylindrical battery cell, a square battery cell and other types of battery cells. The battery cell in the present application may be a lithium ion battery cell, a potassium ion battery cell, a sodium ion battery cell, a lithium sulfur battery cell, or the like, and particularly preferably, a lithium ion battery cell. During a charging and discharging process of a cell, active ions are intercalated and disintercalated back and forth between the positive electrode plate and the negative electrode plate. The electrolyte solution plays the role of conducting ions between the positive electrode plate and the negative electrode plate.

In the present application, a "battery cell" refers to a cell capable of charging and discharging independently. Components of a battery cell include a positive electrode plate, a negative electrode plate, a separator, an electrolyte solution, an outer package for packaging the positive electrode plate, the negative electrode plate, the separator, the electrolyte solution, or the like. In the present application, types and shapes of the battery cell are not specifically restricted, which may be a pouch battery cell, a cylindrical battery cell, a square battery cell and other types of battery cells. The battery cell in the present application may be a lithium ion battery cell, a potassium ion battery cell, a sodium ion battery cell, a lithium sulfur battery cell, or the like, and particularly preferably, a lithium ion battery cell. During a charging and discharging process of a battery, active ions are intercalated and disintercalated back and forth between the positive electrode plate and the negative electrode plate. The electrolyte solution plays the role of conducting ions between the positive electrode plate and the negative electrode plate.

In the present application, a "chemical system" of a battery cell is classified according to components of a positive active material used in a positive electrode plate in the battery cell, and elements or substances doped or coated with the positive active material are not limited. For example, a battery cell whose positive active material is lithium iron phosphate (including that doped with Mn or V element) may be defined as a battery cell of a lithium iron phosphate chemical system. A battery cell whose positive active material is lithium nickel cobalt manganate (generally referred to as NCM for short) may be defined as a battery cell of an NCM chemical system. Further, a battery cell chemical system may be further limited based on the relative content of nickel, cobalt, and manganese in the positive active material. For example, a battery cell whose positive active material is $LiNi_{0.5}Co_{0.2}Mn_{0.3}O_2$ (generally referred to as NCM523 for short) may be defined as a battery cell of an NCM523 chemical system, a battery cell whose positive active material is $LiNi_{0.6}Co_{0.2}Mn_{0.2}O_2$ (generally referred to as NCM622 for short) may be defined as a battery cell of an NCM622 chemical system, and a battery cell whose positive active material is $LiNi_{0.8}Co_{0.1}Mn_{0.1}O_2$ (generally referred to as NCM811 for short) may be defined as a battery cell of an NCM811 chemical system. A battery cell whose positive material is a nickel cobalt lithium aluminate (generally referred to as NCA) may be defined as a battery cell of an NCA chemical system. In addition, in the present application, a battery cell of a hybrid system may also be used, for example, a battery cell of a hybrid system including NCM and NCA.

Hereinafter, basic structures of a positive electrode plate, a negative electrode plate, an electrolyte solution and a separator included in the battery cell in the present application will be described first.

<Negative Electrode Plate>

The battery cell of the present application includes a negative electrode plate, the negative electrode plate includes a negative current collector and a negative film layer arranged on at least one surface of the negative current collector, and the negative film layer includes a negative active material.

In one embodiment of the present application, the negative active material in the negative film layer may be a negative active material commonly used in the art, for example one or more of natural graphite, artificial graphite, soft carbon, hard carbon, silicon-based materials, tin-based materials and lithium titanate. The silicon-based material may be selected from one or more of elemental silicon, silicon oxide, and silicon-carbon composite. The tin-based material may be selected from one or more of elemental tin, tin oxide compounds, and tin alloys.

In the battery cell of the present application, in addition to containing the negative active material, the negative film sheet may further include an optional binder, an optional conductive agent and other optional additives. The negative electrode plate of the present application is usually formed by coating and drying a negative slurry. The negative slurry is usually formed by dispersing the negative active material, the optional conductive agent, the optional binder, or the like in a solvent and stirring them evenly. The above solvent may be N-methylpyrrolidone (NMP) or deionized water.

As an example, the conductive agent may include one or more of superconducting carbon, carbon black (such as acetylene black, Ketjen black), carbon dots, carbon nanotubes, graphene, and carbon nanofibers.

As an example, the binder may include one or more of styrene butadiene rubber (SBR), water-soluble unsaturated resin SR-1B, polyacrylic acid (PAA), polyacrylate sodium (PAAS), polyacrylamide (PAM), polyvinyl alcohol (PVA), sodium alginate (SA) and carboxymethyl chitosan (CMCS). As an example, the binder may include one or more of styrene butadiene rubber (SBR), polyvinyl alcohol (PVA), sodium alginate (SA), polymethacrylic acid (PMAA) and carboxymethyl chitosan (CMCS). Other optional additives are, for example, thickeners (such as sodium carboxymethyl battery cellulose CMC-Na), PTC thermistor materials, or the like.

In addition, in the battery cell of the present application, the negative electrode plate does not exclude other additional functional layers other than the negative film layer. For example, in some embodiments, the negative electrode plate of the present application may further include a conductive primer layer (for example, made of the conductive agent and the binder) sandwiched between the negative current collector and a first negative film layer and disposed on a surface of the negative current collector. In some other embodiments, the negative electrode plate of the present application may further include a covering protective layer covering a surface of a second negative electrode film layer.

In the battery cell of the present application, the negative current collector may be a metal foil or a composite current collector. For example, the metal foil may be a copper foil, a silver foil, an iron foil, or a foil composed of an alloy of the above metals. The composite current collector may include a polymer material base layer and a metal layer formed on at least one surface of the polymer material base layer, and may be formed by forming a metal material (copper, copper alloy, nickel, nickel alloy, titanium, titanium alloy, silver, silver alloy, or the like) on the polymer material base layer (such as a base layer made of polypropylene PP, polyethylene terephthalate PET, polybutylene terephthalate PBT, polystyrene PS, polyethylene PE and their copolymers, or the like).

<Positive Electrode Plate>

In the battery cell of the present application, the positive electrode plate includes a positive current collector, and a positive film layer arranged on at least one surface of the positive current collector and including a positive active material. For example, the positive current collector has two surfaces opposite in its thickness direction, and the positive film layer is arranged on either or both of the two opposite surfaces of the positive current collector. In the battery cell of the present application, the positive current collector may be a metal foil or a composite current collector, for example, the metal foil may be an aluminum foil, while the composite current collector may include a polymer material base layer and a metal layer formed on at least one surface of the polymer material base layer. The composite current collector can be formed by forming a metal material (aluminum, aluminum alloy, nickel, nickel alloy, titanium, titanium alloy, silver, silver alloy, or the like) on a polymer material substrate (such as a substrate of polypropylene PP, polyethylene terephthalate PET, polybutylene terephthalate PBT, polystyrene PS, polyethylene PE and their copolymers, or the like).

In the battery cell of the present application, the positive active material may be a positive material for the battery cell known in the art. For example, the positive active material may include one or more of the following: lithium containing phosphate in an olivine structure, lithium transition metal oxide and their respective modified compounds. But the present application is not limited to these materials, and other traditional materials that can be used as positive active materials of the battery cell may also be used. One type of these positive active materials may be used alone, or two or more types may be used in combination. Examples of the lithium transition metal oxide may include, but are not limited to, one or more of lithium cobalt oxide (such as $LiCoO_2$), lithium nickel oxide (such as $LiNiO_2$), lithium manganese oxide (such as $LiMnO_2$, $LiMn_2O_4$), lithium nickel cobalt oxide, lithium manganese oxide, lithium nickel manganese oxide, lithium nickel cobalt manganese oxide (such as $LiNi_{1/3}Co_{1/3}Mn_{1/3}O_2$ (NCM333), $LiNi_{0.5}Co_{0.2}Mn_{0.3}O_2$ (NCM523), $LiNi_{0.5}Co_{0.25}Mn_{0.25}O_2$ (NCM211), $LiNi_{0.6}Co_{0.2}Mn_{0.2}O_2$ (NCM622), $LiNi_{0.8}Co_{0.1}Mn_{0.1}O_2$ (NCM811)), lithium nickel cobalt aluminum oxide (such as $LiNi_{0.85}Co_{0.15}Al_{0.05}O_2$) and their modified compounds, or the like. Examples of the lithium containing phosphate in the olivine structure may include, but are not limited to, one or more of lithium iron phosphate (such as $LiFePO_4$ (LFP)), a composite material of lithium iron phosphate and carbon, lithium manganese phosphate (such as $LiMnPO_4$), a composite material of lithium manganese phosphate and carbon, lithium manganese iron phosphate, and a composite material of lithium manganese iron phosphate and carbon.

In some embodiments, the positive film layer may also optionally include a binder. Non-limiting examples for the binder of the positive film layer may include one or more of the following: polyvinylidene fluoride (PVDF), polytetrafluoroethylene (PTFE), vinylidene fluoride tetrafluoroethylene propylene terpolymer, vinylidene fluoride hexafluoropropylene tetrafluoroethylene terpolymer, tetrafluoroethylene hexafluoropropylene copolymer and fluoroacrylate resin.

In some embodiments, the positive film layer may further optionally include a conductive agent. Examples for the conductive agent of the positive film layer may include one or more of superconducting carbon, acetylene black, carbon black, Ketjen black, carbon dots, carbon nanotubes, graphene, and carbon nanofibers.

In one embodiment of the present application, the positive electrode can be prepared in the following manner dispersing the above components for preparing the positive electrode, such as the positive active material, the conductive agent, the binder, and any other components, in a solvent (such as N-methylpyrrolidone) to form a uniform positive slurry; coating the positive slurry on the positive current collector, and then after drying, cold pressing and other processes, the positive electrode plate can be obtained.

<Electrolyte Solution>

An electrolyte solution plays a role of conducting ions between a positive electrode plate and a negative electrode plate. The electrolyte solution includes an electrolyte salt and a solvent. In some embodiments, the electrolyte salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluorooxalate (LiDFOB), lithium dioxalate (LiBOB), lithium difluorophosphate ($LiPO_2F_2$), lithium difluorobisoxalate phosphate (LiDFOP) and lithium tetrafluorooxalate phosphate (LiTFOP).

In one embodiment of the present application, the solvent may be selected from one or more of the following: ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and two ethyl sulfone (ESE).

In one embodiment of the present application, based on a total weight of the electrolyte solution, the content of the solvent is 60-99% by weight, such as 65-95% by weight, or 70-90% by weight, or 75-89% by weight, or 80-85% by weight. In one embodiment of the present application, based on a total weight of the electrolyte solution, the content of the electrolyte is 1-40% by weight, for example, 5-35% by weight, or 10-30% by weight, or 11-25% by weight, or 15-20% by weight.

In one embodiment of the present application, the electrolyte solution may further optionally include an additive. For example, the additive may include one or more of the following: a negative film-forming additive, a positive film-forming additive, and an additive that can improve certain performance of a battery, such as an additive that improves overcharging performance of a battery, an additive that improves high-temperature performance of a battery, and an additive that improves low-temperature performance of a battery, or the like.

<Separator>

In one embodiment of the present application, the battery cell further includes a separator, which separates a positive electrode plate and a negative electrode plate of the battery cell, and provides selective penetration or barrier to substances of different types, sizes, and charges in the system. For example, the separator can insulate electrons, physically separate positive and negative active substances of the battery cell, prevent internal short circuits and form an electric field in a certain direction, and at the same time enable ions in the battery to pass through the separator and move between positive and negative electrodes.

In one embodiment of the present application, a material used to prepare the separator may include one or more of glass fiber, non-woven fabric, polyethylene, polypropylene, and polyvinylidene fluoride. The separator may be a single-layer film or a multilayer composite film. When the separator is the multilayer composite film, materials of layers may be the same or different.

In one embodiment of the present application, the above positive electrode plate, negative electrode plate and separator may be made into an electrode assembly/a bare battery cell through a winding process or a lamination process.

In one embodiment of the present application, the battery cell further includes an outer package, and the outer package may be used to package the above electrode assembly and electrolyte solution. In some embodiments, the outer package of the battery cell may be a hard shell, such as a hard plastic shell, an aluminum shell, a steel shell, or the like. In other embodiments, the outer package of the battery cell may be a soft package, such as a bag-type soft package. A material of the soft package may be plastic, for example, one or more of polypropylene (PP), polybutylene terephthalate (PBT), polybutylene succinate (PBS), or the like.

Figure 2:
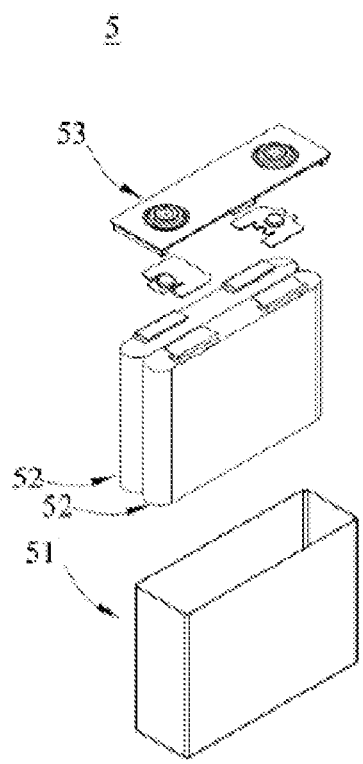
FIG. 2 is an exploded view showing an example of the battery cell of the present application shown in FIG. 1.

FIG. 1 is a schematic diagram showing an example of a battery cell 5 of the present application. FIG. 2 is an exploded view showing an example of the battery cell 5 of the present application shown in FIG. 1.

The outer package may include a housing 51 and a cover plate 53, and the housing 51 may include a bottom plate and a side plate connected to the bottom plate. The bottom plate and the side plate enclose and form an accommodating cavity. The housing 51 has an opening communicating with the accommodating cavity, and the cover plate 53 can cover the opening to close the accommodating cavity. A positive electrode plate, a negative electrode plate and a separator can form an electrode assembly 52 through a winding process or a lamination process, the electrode assembly is packaged in the accommodating cavity, and an electrolyte solution is infiltrated in the electrode assembly 52. The number of electrode assemblies 52 contained in the battery cell 5 may be one or more.

[Battery Module]

In the present application, a "battery module" is formed by electrically connecting a certain number of battery cells together and putting them into a frame in order to protect the battery cells from external impact, heat, vibration, etc. The shape of the battery cell of the present application may be cylindrical, square or other arbitrary shapes.

In the present application, several battery cells may be assembled together to form a battery module. The battery module contains two or more battery cells, and the specific number depends on the application of the battery module and parameters of a single battery module.

Figure 3:
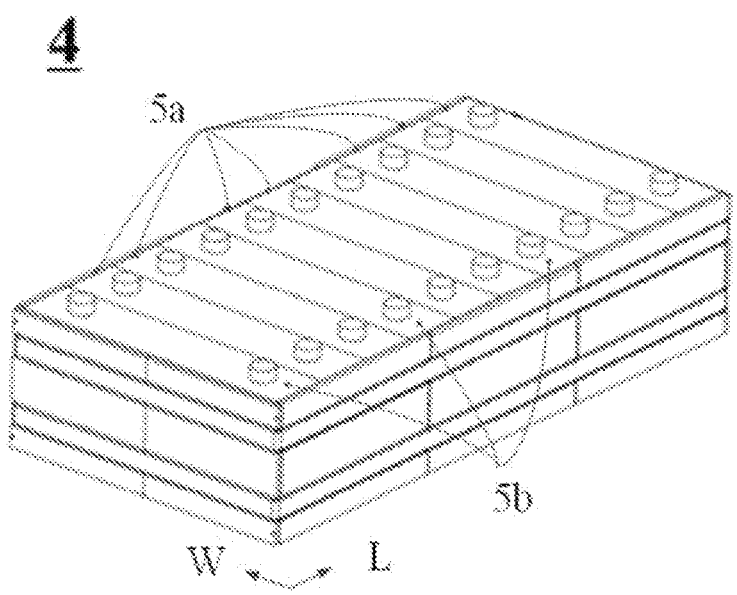
FIG. 3 is a schematic diagram showing an example of a battery module of the present application.

FIG. 3 is a schematic diagram showing an example of a battery module of the present application. Referring to FIG. 3, in a battery module 4, a plurality of battery cells 5a, 5b may be arranged in sequence along a length direction of the battery module 4 (5a may be a first battery cell, and 5b may be a second battery cell). Certainly, the battery cells may also be arranged in any other manner. Furthermore, the plurality of battery cells 5a, 5b can be fixed by fasteners. Optionally, the battery module 4 may further include a housing with an accommodating space, and the plurality of battery cells 5a, 5b are accommodated in the accommodating space.

<About Design of First-Type Battery Cell and Second-Type Battery Cell>

In the present application, a battery module includes a first-type battery cell and a second-type battery cell electrically connected at least in series, the first-type battery cell and the second-type battery cell are battery cells of different chemical systems, the first-type battery cell includes N first battery cell(s), the second-type battery cell includes M second battery cell(s), N and M are positive integers; the first battery cell includes a first negative electrode plate, the second battery cell includes a second negative electrode plate, a ratio of a conductivity of an electrolyte solution (25° C.) of the first battery cell to a coating mass per unit area of the first negative electrode plate is denoted as M1, a ratio of a conductivity of an electrolyte solution (25° C.) of the second battery cell to a coating mass per unit area of the second negative electrode plate is denoted as M2, where a unit of the conductivity of the electrolyte solution is mS/cm, a unit of the coating mass per unit area is mg/cm$^2$, and M1 and M2 satisfy: M1>M2, 0.08≤M1≤11, and 0.03≤M2≤4.62.

In some embodiments of the present application, 0.33≤M1≤6.42, 0.17≤M2≤2.57. Optionally, 0.63≤M1≤1.94, 0.63≤M2≤1.1.

Hereinafter, for ease of illustration, sometimes, a conductivity of an electrolyte solution is denoted as 6 (unit: mS/cm), a coating mass per unit area of a negative electrode plate is denoted as CW (unit: mg/cm$^2$), a compacted density of a negative electrode plate is denoted as PD (unit: g/cm$^3$), and a ratio of a conductivity of an electrolyte solution to a coating mass per unit area of a negative electrode plate is denoted as M (M1 and M2 respectively correspond to the first-type battery cell and the second-type battery cell).

The inventors of the present application have found through intensive studies that: the conductivity of the electrolyte solution is positively correlated with the lithium plating window, the coating mass per unit area of the negative electrode plate is negatively correlated with the lithium plating window, and the ratio M of the conductivity of the electrolyte solution to the coating mass per unit area of the negative electrode plate is greater, the larger the lithium plating window. Since the first-type battery cell and the second-type battery cell are connected at least in series, when the ratio M1 of the conductivity of the electrolyte solution of the first battery cell to the coating mass per unit area of the first negative electrode plate and the ratio M2 of the conductivity of the electrolyte solution of the second battery cell to the coating mass per unit area of the second negative electrode plate satisfy: when M1>M2, the lithium plating window of the first battery cell>the lithium plating window of the second battery cell can be made, and it may implement that when the second-type battery cell in the battery module performs a fast charging, the first-type battery cell is not prone to lithium plating and other safety problems.

Figure 7:
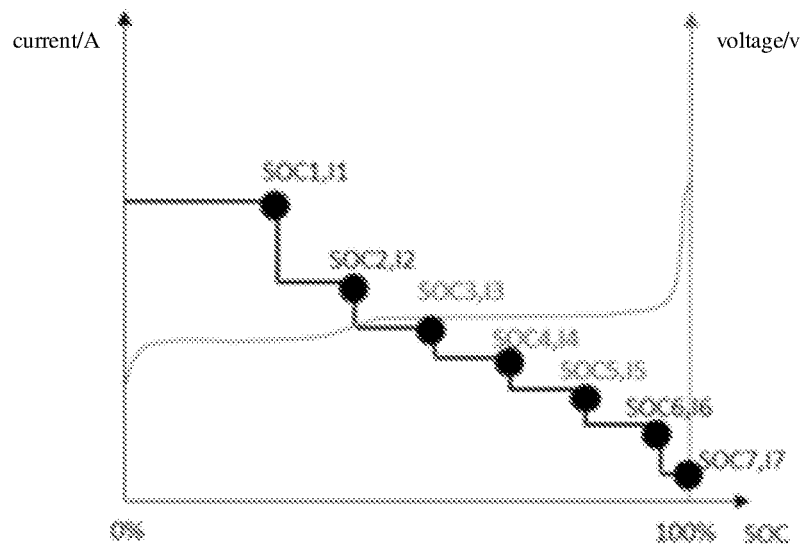
FIG. 7 is a schematic diagram showing an example of a charging curve when a stepped charging of a first-type battery cell (lithium iron phosphate battery cell) in a battery module is controlled by voltage using embodiments of the present application.
Figure 8:
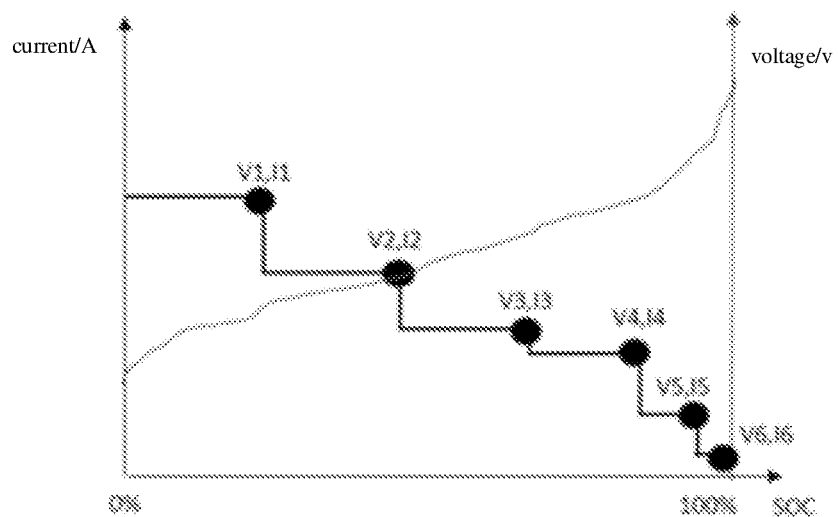
FIG. 8 is a schematic diagram showing a charging curve when a stepped charging of a lithium iron phosphate battery cell is controlled according to a SOC value in the prior art.

FIG. 7 is a schematic diagram showing an example of a charging curve when a stepped charging of a first-type battery cell (a lithium iron phosphate battery cell as an example) in a battery module is controlled by voltage using embodiments of the present application.

As shown in FIG. 7, according to the embodiments of the present application, when performing the stepped charging on the first-type battery cell (a lithium iron phosphate battery cell) in the battery module, the second-type battery cell (such as a ternary-based battery cell) is used to control the charging of the first-type battery cell. Since the slope K2 of the SOC-OCV curve of the second-type battery cell is greater, the accuracy during the stepped charging is higher, and the current SOC value of the first-type battery cell can be displayed more accurately. At the same time, it may implement that when the battery module uses the stepped charging, the fast charging is safer, and the first-type battery cell is not prone to a problem of the lithium plating.

For example, in FIG. 7, firstly, the first-type battery cell is charged with a constant current I1; when an OCV voltage of the second-type battery cell reaches V1 after a first predetermined time, a charging current suddenly changes to I2, and the charging continues with a constant current I2; when the OCV voltage of the second-type battery cell reaches V2 after a second predetermined time, the charging current suddenly changes to I3, and the charging continues with a constant current I3; when the OCV voltage of the second-type battery cell reaches V3 after a third predetermined time, the charging current suddenly changes to I4, and the charging continues with a constant current I4; when the OCV voltage of the second-type battery cell reaches V4 after a fourth predetermined time, the charging current suddenly changes to I5, and the charging continues with a constant current I5; and when the OCV voltage of the second-type battery cell reaches V5 after a fifth predetermined time, the charging current suddenly changes to I6, and the charging continues with a constant current I6 until the first-type battery cell is fully charged. When the first-type battery cell is fully charged, the OCV voltage of the second-type battery cell becomes a cut-off charging voltage V6.

As mentioned above, when the battery module contains the battery cells of different chemical systems, and the slope K2 of the SOC-OCV curve of the second-type battery cell is greater than the slope K1 of the SOC-OCV curve of the first-type battery cell, a constant current charging current of the first-type battery cell is controlled according to the OCV voltage of the second-type battery cell, and thus the accuracy during the stepped charging is higher, so that the fast charging using the stepped charging is safer and more reliable, and the current SOC value of the first-type battery cell can be displayed more accurately.

Here, "SOC" indicates State Of Charge, which refers to a ratio of a current remaining power of the battery cell to a rated capacity under the same conditions, for example, it may be 100%, 99%, 90%, 80%, 70%, 60%, 50%, 40%, 30%, 20%, 10%, 0%. "OCV" indicates Open Circuit Voltage.

In addition, the inventors of the present application have further found that: charge transfer resistance Rct and diffusion impedance Rdiff (for example, a solid phase diffusion in a negative active substance near a current collector side when lithium ions are intercalated and disintercalated) can be reduced by making the conductivity of the electrolyte solution larger and the coating mass per unit area of the negative electrode plate smaller, so as to improve lithium ion transmission dynamical characteristics of the first-type battery cell.

In the present application, a test on the conductivity of the electrolyte solution can be implemented by directly selecting conductive electrodes. Generally, the conductive electrodes are two parallel electrode plates whose area A and distance L are determined, corresponding to an electrode conductivity constant K. A resistance R is measured by an electrochemical alternating-current impedance, and a conductivity ζ=K/R. In order to ensure the accuracy of the test, a conductivity constant K needs to be calibrated by a standard solution before the test. The parallel electrode plate is a bright platinum electrode or a platinum black electrode, which needs to be selected in combined with an approximate conductivity of the electrolyte solution and a test range of different types of conductive electrodes. Generally, a bright electrode is used to measure a smaller conductivity, while the platinum black electrode is used to measure a larger conductivity. Due to a large surface area of the platinum black electrode, a current density is reduced to reduce or eliminate polarization; and when measuring a solution with a low conductivity, the platinum black electrode has a strong adsorption effect on an electrolyte and appears an unstable phenomenon, and at this time, the bright platinum electrode is proper to be used. For a test on an aqueous electrolyte solution, an appropriate amount of electrolyte solution is directly added into a glass tube, and the added amount needs ensure that a liquid level exceeds the electrode plate of the conductive electrode; while an organic electrolyte solution needs to be tested in a glove box filled with high purity argon, or a sealed container is designed according to requirements, and vacuum silicone grease or vaseline is coated on an interface position to achieve a better sealing effect, and finally a battery assembly is completed. After the assembly is completed, two wires of the conductive electrodes are connected to an electrochemical workstation to proceed to a next test. As an example, a conductivity meter REX® DDSJ-318 may be used to test a resistance of the electrolyte solution under conditions of 25° C. and 1 kHz alternating-current impedance, and computer a conductivity σ of the electrolyte solution.

In the present application, as a well-known meaning in the art, the coating mass per unit area of the negative electrode plate refers to a mass of a negative active substance layer on a signal side of a current collector per unit area, which can be measured by a method known in the art. For example, an electrode plate coated on a signal side and cold pressed or an electrode plate disassembled from the battery cell is taken (if it is an electrode plate coated on both sides, an active substance layer of one side can be wiped off first), punched and cut into a small disc with an area of S1, and a mass is weighed and denoted as m1; then the active substance layer of the above surface of the electrode plate is soaked with a solvent and completely peeled off from a surface of a current collector, and a mass of the current collector is weighed and denoted as m2; finally, a mass (m1−m2) of the active substance layer is divided by a coating area of an active substance S1 (that is, (m1−m2)/S1), so that the coating mass per unit area of the electrode plate may be obtained.

In some embodiments of the present application, a state of charge-open circuit voltage (SOC-OCV) curve of the first battery cell satisfies at least one of the following conditions: (1) in an interval of 5%-95% SOC, a slope k1 of the SOC-OCV curve of the first battery cell is ≤5 mV/% SOC; (2) in the SOC-OCV curve of the first battery cell, there is at least a flat curve with a span not less than 10% SOC and the slope k1≤5 mV/% SOC.

In some embodiments of the present application, a state of charge-open circuit voltage (SOC-OCV) curve of the second battery cell satisfies at least one of the following conditions: (1) in the interval of 5%-95% SOC, a slope k2 of the SOC-OCV curve of the second battery cell is >5 mV/% SOC, optionally, k2≥6 mV % SOC, and further optionally, k2≥9 mV/% SOC; (2) in the SOC-OCV curve of the second battery cell, there is at least a curve with a span not less than 10% SOC and the slope k2>5 mV/% SOC.

In the present application, the slope of the SOC-OCV curve can be tested using a test method known in the art. As an example, the following steps can be used for testing:
  charging SOC-OCV test (the first-type battery cell and the second-type battery cell are the same): firstly, obtain nominal design of the corresponding battery cell, nominal capacity C, and voltage application interval: V1-V2 (lower limit voltage-upper limit voltage);
Test Procedure (Confirmation of Battery Cell Attenuation, Capacity Correction):
  1) 0.33 C discharge to V1;
  2) stand for 10 minutes;
  3) 0.33 C charge to V2, constant voltage charge to current can b;
  4) stand for 10 minutes;
  5) 0.33 C discharge to V1; (record a discharging capacity C0 in this step);
Test Procedure (SOC-OCV Test):
  1) 0.33 C0 discharge to V1;
  2) stand for 3 h;
  3) 0.05 C0 charge to V2; (point interval 1S; extract voltage and capacity data, and use a final capacity in this step as Cn);
  4) stand for 10 minutes;
Data Processing:
  Cn is taken as a corresponding point of 100% SOC to obtain SOC corresponding to each voltage in a point record and a corresponding charging cumulative capacity, and a charging SOC-OCV curve is drawn; and a first battery cell SOC-OCV curve 1 and a second battery cell SOC-OCV curve 2 are respectively obtained by this method;
Slope Test:
  According to the charging SOC-OCV curve, with two points (SOC1, V1) and (SOC2, V2), a slope K=(V2-V1)/(SOC2-SOC1) corresponding to SOC1~SOC2 is obtained.

In some embodiments of the present application, a compacted density of the first negative electrode plate is PD1, a compacted density of the second negative electrode plate is PD2, where PD1≤PD2, and 0.5≤PD1≤3, 0.5≤PD2≤3, and a unit is $g/cm^3$. Optionally, 1≤PD1≤2, 1≤PD2≤2. Further optionally, 1.2≤PD1≤1.7, 1.2≤PD2≤1.7.

The inventors of the present application have found through intensive studies that: the lithium plating window, the charge transfer resistance Rct and the diffusion impedance Rdiff are also related to the compacted density of the negative electrode plate (the diffusion resistance Rdiff has a greater influence). The greater the compacted density, the closer particles are packed, and at this time, an infiltration effect of the electrolyte solution becomes worse, a migration path between negative active substances (such as graphite) becomes smaller, and a chance of a liquid phase diffusion becomes less; on the other hand, an accumulation gap between the particles becomes smaller and an ion diffusion path becomes narrower, so that the lithium ions become difficult to be intercalated and disintercalated, resulting a smaller lithium plating window.

In the present application, the compacted density of the negative electrode plate can be tested using a method known in the art. As exemplary test method is as follows: a negative electrode plate coated on one side and cold pressed is taken (if it is an electrode plate coated on both sides, a negative film layer of one side can be wiped off first), punched and cut into a small disc with an area of S1, and a mass is weighed and denoted as m1; a thickness of the negative film layer is tested and denoted as H; then the negative film layer is wiped off, and a mass of a negative current collector is weighted and denoted as m2; and the compacted density of the negative film layer is dc=(m1−m2)/S1/H.

In some embodiments of the present application, a coating mass per unit area of the first negative electrode plate is CW1, a coating mass per unit area of the second negative electrode plate is CW2, where $6.49 \leq CW1 \leq 17$, $4.54 \leq CW2 \leq 25.51$, and a unit is: mg/cm². Optionally, $7.79 \leq CW1 \leq 11.69$, $6.23 \leq CW2 \leq 15.19$. Further optionally, $9.09 \leq CW1 \leq 11.04$, $7.73 \leq CW2 \leq 12.69$. Still further optionally, $CW1 \leq CW2$. The inventors of the present application have found through intensive studies that: a coating mass of an active substance layer of a negative electrode plate needs to be controlled within an appropriate range. On one hand, a thickness of the active substance layer can be controlled to increase internal reaction uniformity of a negative active substance layer, reduce polarization of the active substance layer, and improve a power performance of the battery cell; on the other hand, energy density of the battery cell and a module may be ensured to be higher to reduce a manufacturing cost of the battery cell per watt hour.

In the present application, by optimizing and designing the coating mass per unit area of the first negative electrode plate and the coating mass per unit area of the second negative electrode plate, it may implement that a lithium ion diffusion path and capacity characteristics of the negative electrode plate in the first-type battery cell and the second-type battery cell can be effectively compatible, so as to further improve volumetric energy density of the battery module and safety of the fast charging.

In some embodiments of the present application, a negative active substance of the first negative electrical sheet and a negative active substance of the second negative electrical sheet can be independently selected from one or more of artificial graphite, natural graphite, soft carbon, hard carbon, silicon-based material, tin-based material and lithium titanate.

In some embodiments of the present application, a ratio of the number N of the first battery cells to the number M of the second battery cells is 0.1~50, optionally 0.3~30, and further optionally 0.5~10.

[Battery Pack]

In one embodiment of the present application, two or more of the above battery modules may be assembled into a battery pack, and the number of the battery modules contained in the battery pack depends on the application of the battery pack and parameters of a single battery module. The battery pack may include a battery box and a plurality of battery modules arranged in the battery box, the battery box includes an upper box body and a lower box body, and the upper box body can be covered on the lower box body and matched well with it to form an enclosed space for accommodating the battery module. Two or more battery modules may be arranged in the battery box in a desired manner. In the present application, the "battery pack" is made by further assembling various control and protection systems such as a battery management system and a thermal management system for one or more battery modules (or a combination directly formed by a plurality of battery cells).

Figure 4:
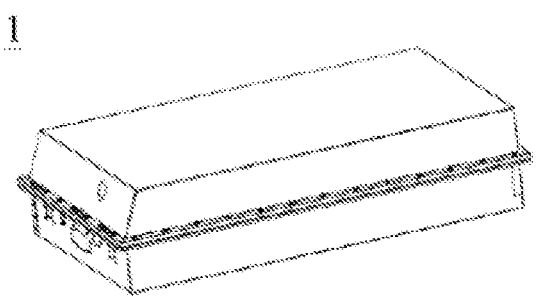
FIG. 4 is a schematic diagram showing an example of a battery pack of the present application.
Figure 5:
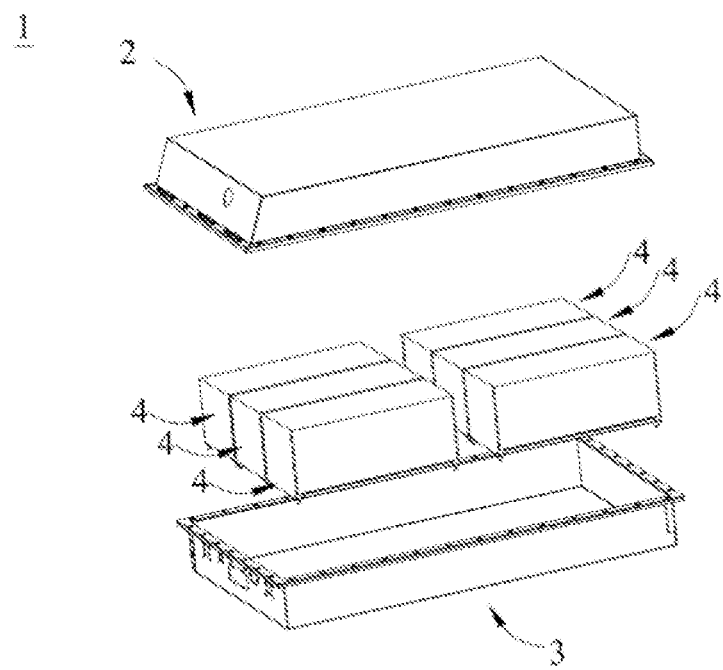
FIG. 5 is an exploded view showing an example of the battery pack of the present application shown in FIG. 4.

FIG. 4 is a schematic diagram showing an example of a battery pack 1 of the present application. FIG. 5 is an exploded view showing an example of the battery pack 1 of the present application shown in FIG. 4. Referring to FIG. 4 and FIG. 5, the battery pack 1 may include a battery box and a plurality of battery modules 4 arranged in the battery box. The battery box includes an upper box body 2 and a lower box body 3, and the upper box body 2 is used to cover the lower box body 3 and form an enclosed space for accommodating the battery module 4. The plurality of battery modules 4 can be arranged in the battery box in any manner.

[Power Consumption Apparatus]

In one embodiment of the present application, a power consumption apparatus of the present application includes at least one of a battery module or a battery pack of the present application, and the battery module or battery pack may serve as a power supply of the power consumption apparatus or an energy storage unit of the power consumption apparatus. The power consumption apparatus may include, but is not limited to, a mobile digital apparatus (such as a mobile phone, a laptop, or the like), an electric vehicle (such as a pure electric vehicle, a hybrid electric vehicle, a plug-in hybrid electric vehicle, an electric bicycle, an electric scooter, an electric golf cart, an electric truck, or the like), an electric train, a ship and satellite, an energy storage system, or the like.

Figure 6:
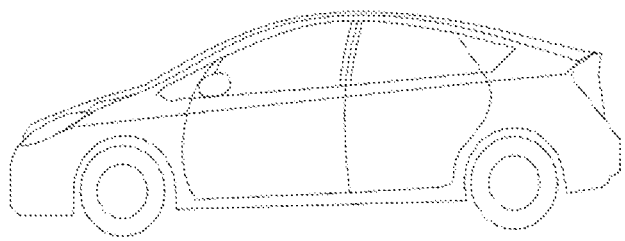
FIG. 6 is a schematic diagram showing an example of a power consumption apparatus using the battery module of the present application as a power supply.

FIG. 6 is a schematic diagram showing an example of a power consumption apparatus using the battery module of the present application as a power supply. The power consumption apparatus is a pure electric vehicle, a hybrid electric vehicle, or a plug-in hybrid electric vehicle, or the like. In order to meet requirements for high power and high energy density of the power consumption apparatus, the battery module or the battery pack may be used.

[Manufacturing Method and Manufacturing Device]

The present application provides a manufacturing method of a battery module, including the following steps: obtaining a first-type battery cell and a second-type battery cell, the first-type battery cell and the second-type battery cell are battery cells of different chemical systems, the first-type battery cell includes N first battery cell(s), the second-type battery cell includes M second battery cell(s), N and M are positive integers, the first battery cell includes a first negative electrode plate, the second battery cell includes a second negative electrode plate, a ratio of a conductivity of an electrolyte solution (25° C.) of the first battery cell to a coating mass per unit area of the first negative electrode plate is denoted as M1, a ratio of a conductivity of an electrolyte solution (25° C.) of the second battery cell to a coating mass per unit area of the second negative electrode plate is denoted as M2, where a unit of the conductivity of the electrolyte solution is mS/cm, a unit of the coating mass per unit area is mg/cm², and M1 and M2 satisfy: M1>M2, and $0.08 \leq M1 \leq 11$, $0.03 \leq M2 \leq 4.62$; and the first-type battery cell and the second-type battery cell are electrically connected at least in series to form the above battery module.

The present application provides a manufacturing device of a battery module, including: a clamping arm unit configured to obtain a first-type battery cell and a second-type battery cell, the first-type battery cell and the second-type battery cell are battery cells of different chemical systems, the first-type battery cell includes N first battery cell(s), the second-type battery cell comprises M second battery cell(s), N and M are positive integers, the first battery cell includes a first negative electrode plate, the second battery cell includes a second negative electrode plate, a ratio of a conductivity of an electrolyte solution (25° C.) of the first battery cell to a coating mass per unit area of the first negative electrode plate is denoted as M1, a ratio of a conductivity of an electrolyte solution (25° C.) of the second battery cell to a coating mass per unit area of the second negative electrode plate is denoted as M2, where a unit of the conductivity of the electrolyte solution is mS/cm, a unit of the coating mass per unit area is mg/cm², and M1 and M2 satisfy: M1>M2, and $0.08 \leq M1 \leq 11$, $0.03 \leq M2 \leq 4.62$; an assembling unit configured to electrically connect the first-type battery cell and the second-type battery cell at least in series to form the above battery module; and a control unit configured to control the clamping arm unit and the assembling unit.

Therefore, a battery module manufactured using a manufacturing method and a manufacturing device of the present application may implement fast charging capabilities of the battery module containing battery cells of different types of chemical systems and safety during a fast charging process.

Hereinafter, technical solutions of the present application and advantages thereof are described in detail through specific embodiments.

<Battery Cell Preparation>

With reference to GB/T 31484-2015 *Requirements and Test Methods for Cycle Life of Power Batteries for Electric Vehicles*, preparation methods of the battery cell in each embodiment and each comparing embodiment are as follows.

1. Preparation of Positive Slurry

A positive active material and conductive carbon (there may be more than one kind of the conductive carbon), binder polyvinylidene fluoride (PVDF) and other positive additives are fully stirred and mixed in an appropriate amount of N-methylpyrrolidone (NMP for short) solvent according to a weight ratio of a design goal (a proportion here is not fixed, which can be set according to requirements), so as to form a uniform and stable slurry with a viscosity of 5000~30000 mPa·s, and no gelation, delamination or settlement and other phenomenon occurred in the slurry in 24 hours for standing.

2. Preparation of Positive Electrode Plate

The positive slurry is uniformly coated on a positive current collector Al foil, so that a coating mass per unit area of a film after drying reaches a set value, and an electrode plate is cold pressed to achieve a design compaction, then separately striped for a later use to obtain positive electrode plates.

3. Preparation of Electrolyte Solution

Preparation of a typical electrolyte solution is taken as an example (the electrolyte solution can be adjusted, according to design requirements, with solvents, salts and additives): an equal volume of vinyl carbonate is dissolved in propylene carbonate, then an appropriate amount of lithium hexafluorophosphate is uniformly dissolved in the mixed solvent for a later use, and electrolyte solution additives are added according to a design, an electrolyte solution then is obtained after fully and uniformly dissolving.

4. Preparation of Negative Electrode Plate

Negative active material graphite and conductive carbon black, binder polystyrene butadiene copolymer (SBR), thickener sodium carboxymethylbattery cellulose (CMC) and negative additives, or the like are fully stirred and mixed in an appropriate amount of water solvent according to a design weight ratio to form a uniform negative stable slurry; and the slurry is uniformly coated on a negative current collector Cu foil, so that a coating mass per unit area of a film after drying reaches a set value, and an electrode plate is cold pressed to achieve a design compaction, then separately striped for a later use.

5. Separator

A separator with PP as a main material is selected as a separator of a battery cell.

6. Preparation of Battery Cell

A conventional battery cell manufacturing process is used. The positive electrode plate, y separator and the negative electrode plate are wound together to form a bare battery cell, then placed in a battery housing, injected with the electrolyte solution, followed by forming, sealing and other processes, and finally a rechargeable power battery cell is obtained.

<Assembly of Battery Module>

A battery module is electrically connected in series with a first-type battery cell and a second-type battery cell, the first-type battery cell and the second-type battery cell are battery cells of different chemical systems, the first-type battery cell includes seven first battery cells, the second-type battery cell includes two second battery cells, arranged and assembled in a BAAAAAAAB manner (A represents the first battery cell and B represents the second battery cell).

<Test Method of Conductivity of Electrolyte Solution>

A conductivity meter REX® DDSJ-318 is used to test a resistance of an electrolyte solution under conditions of 25° C. and 1 kHz alternating-current impedance, and computer a conductivity σ of the electrolyte solution.

<Test Method of Coating Mass Per Unit Area of Negative Electrode Plate>

An electrode plate coated on one side and cold pressed is taken, an active substance layer on one side is wiped off, the electrode plate is punched and cut into a small disc with an area of S1, and a mass is weighed and denoted as m1; then the active substance layer of the above surface of the electrode plate is soaked with a solvent and completely peeled off from a surface of a current collector, and a mass of the current collector is weighed and denoted as m2; finally, a mass (m1−m2) of the active substance layer is divided by the coating area of an active substance (that is, (m1−m2)/S1), so that the coating mass per unit area of the electrode plate may be obtained.

<Test Method of Compacted Density of Electrode Plate>

A negative electrode plate coated on one side and cold pressed is taken (if it is an electrode plate coated on both sides, a negative film layer on one side can be wiped off first), punched and cut into a small disc with an area of S1, and a mass is weighed and denoted as M1; a thickness of the negative film layer is tested and denoted as H; then the negative film layer is wiped off, and a mass of a negative current collector is weighted and denoted as M2; and a compacted density dc of the negative film layer is =(M1−M2)/S1/H.

<Test Method of Slope of SOC-OCV Curve>

Charging SOC-OCV test (the first-type battery cell and the second-type battery cell are the same): firstly, obtain nominal design of the corresponding battery cell, nominal capacity C, and voltage application interval: V1-V2 (lower limit voltage-upper limit voltage);

Test Procedure (Confirmation of Battery Cell Attenuation, Capacity Correction):
1) 0.33 C discharge to V1;
2) stand for 10 minutes;
3) 0.33 C charge to V2, constant voltage charge to current espondi
4) stand for 10 minutes;
5) 0.33 C discharge to V1; (record a discharging capacity C0 in this step);

Test Procedure (SOC-OCV Test):
1) 0.33 C0 discharge to V1;
2) stand for 3 h;
3) 0.05 C0 charge to V2; (point interval 1S; extract voltage and capacity data, and use a final capacity in this step as Cn);
4) stand for 10 minutes;

Data Processing:

Cn is taken as a corresponding point of 100% SOC to obtain SOC corresponding to each voltage in a point record and a corresponding charging cumulative capacity, and a charging SOC-OCV curve is drawn; and a first battery cell SOC-OCV curve 1 and a first battery cell SOC-OCV curve 2 are respectively obtained by this method;

Slope Test:

According to the charging SOC-OCV curve, with two points (SOC1, V1) and (SOC2, V2), a slope K=(V2−V1)/(SOC2−SOC1) corresponding to SOC1~SOC2 is obtained.

<Test Method of Fast Charging Safety Performance>

Three electrodes production: producing electrodes referred to standard, a lithium plated electrode as a reference electrode is added based on a single-layer laminate production process;

Lithium plating window test: a corresponding lithium plating window is obtained according to a three electrode test of a second-type battery cell, and a specific test procedure is as follows:

Reading basic information of the second-type battery cell: nominal capacity C;

Voltage application interval: V1-V2 (lower limit voltage-upper limit voltage).

A typical selection principle of a test current: X>3 C, one point is taken at every interval 1 C for the test; 1 C≤X≤3 C, one point is taken at every 0.5 C interval for the test; and X<1 C, one point is taken at every 0.2 C interval for the test.

Hard-shell verification and comparison: according to the lithium plating window obtained by the test, the above charging strategy is formulated, that is, a first-type battery cell and a second-type battery cell are charged and discharged at 25° C. according to the above charging strategy for ten times, the first-type battery cell and the second-type battery cell in the battery module are disassembled in a fully charged state, and lithium plating of negative electrodes is compared.

<Description of Lithium Plating Level Determination>

Lithium plating level I: no lithium plating, there is no white lithium plating area on a surface of the disassembled negative electrode in a fully charged state, and a total lithium plating area accounts for <0.1%;

Lithium plating level II: slight lithium plating, there is white dot lithium plating or a small amount of strip lithium plating area on the surface of the disassembled anode in the fully charged state, and the total lithium plating area accounts for 0.1%~0.5%;

Lithium plating level III: moderate lithium plating, there is white dot lithium plating, a strip lithium plating area, or block and flake lithium plating on the surface of the disassembled anode in the fully charged state, and the total lithium plating area accounts for 0.5~5%;

Lithium plating level IV: serious lithium plating, there is white dot, strip, or block and flake lithium plating on the surface of the disassembled anode in the fully charged state, and the total lithium plating area accounts for ≥5%;

Lithium plating levels I and II are qualified (slight lithium plating caused by a special position of the battery cell and manufacturing process fluctuations needs to be considered due to a winding design of a hard shell), and levels III and IV are considered to be unqualified for a fast charging.

The following battery module of embodiments 1~13 and battery module of comparing embodiments 1 and 2 can be obtained by the above method of <Battery Cell Preparation>. In embodiments 1~13 and comparing embodiments 1 and 2, the first-type battery cells all use lithium iron phosphate system battery cells (LFP), and the second-type battery cells all use lithium N, C, M oxide 523 system battery cells (NCM523). In embodiments 1~11, a charging and discharging interval of the second-type battery cell is 2.8~4.35V; in embodiment 12, a charging and discharging interval of the second-type battery cell is 2.8~4.4V; and in embodiment 13, a charging and discharging interval of the second-type battery cell is 2.8~3.8V.

In addition, through the above test method, comparison results between embodiments 1~13 and comparing embodiments 1 and 2 can be obtained as shown in Tables 1~3.

In particular, due to differences in system design, specific active substance materials, electrolyte solution type characteristic additives, battery cell housing sizes, or the like, there may be differences in specific values obtained from tests, but overall trend and regularity should generally conform to results listed in Tables 1~3 below. It can be seen from Table 1 that in a battery module of embodiments 1~5, including a first-type battery cell and a second-type battery cell electrically connected in series, the first-type battery cell and the second-type battery cell are battery cells of different chemical systems, the first-type battery cell includes a first negative electrode plate, the second-type battery cell includes a second negative electrode plate, a ratio of a conductivity of an electrolyte solution (25° C.) of the first battery cell to a coating mass per unit area of the first negative electrode plate is denoted as M1, a ratio of a conductivity of an electrolyte solution (25° C.) of the second battery cell to a coating mass per unit area of the second negative electrode plate is denoted as M2, where a unit of the conductivity of the electrolyte solution is mS/cm and a unit of the coating mass per unit area is mg/cm$^2$; and M1 and M2 satisfy: M1>M2, and 0.08≤M1≤11, 0.03≤M2≤4.62. The inventors of the present application have found that: a conductivity of an electrolyte solution is positively correlated with a lithium plating window, a coating mass per unit area of a negative electrode plate is negatively correlated with the lithium plating window, and a ratio M of the conductivity of the electrolyte solution to the coating mass per unit area of the negative electrode plate is greater, the larger the lithium plating window. It can be seen from embodiments 1-5 and comparing embodiments 1-2 that: since the first-type battery cell and the second-type battery cell are connected at least in series, when M1 of the first battery cell and M2 of the second battery cell satisfy: when M1>M2, the lithium plating window of the first battery cell may be made greater than that of the second battery cell, and it may implement that when the second-type battery cell in the battery module performs a fast charging, the first-type battery cell is not prone to lithium plating and other safety problems.

TABLE 1

Battery Module Parameters and Performance Test Results

| | First-Type Battery Cell | | | | | Second-Type Battery Cell | | | | | Electrical Performance of Battery Module Lithium plating Level Judgment | |
|---|---|---|---|---|---|---|---|---|---|---|---|---|
| | | | | Slope k1 of SOC-OCV Curve in Interval of 5%-95% (mV/% SOC) | | | | | Slope k2 of SOC-OCV Curve in Interval of 5%-95% (mV/% SOC) | | Number of Lithium plating Levels in First-Type Battery Cell | Number of Lithium plating Levels in Second-Type Battery Cell |
| Number | M1 | Conductivity mS/cm | CW mg/cm² | | PD g/cm³ | M2 | Conductivity mS/cm | CW mg/cm² | | PD g/cm³ | | |
| Embodiment 1 | 0.12 | 2.00 | 16.23 | 2.5 ± 2 | 1.30 | 0.03 | 0.50 | 16.15 | 9 ± 2 | 1.30 | I: 2; II: 5 | I: 1; II: 1 |
| Embodiment 2 | 0.88 | 8.00 | 9.11 | 2.5 ± 2 | 1.30 | 0.64 | 7.00 | 10.96 | 9 ± 2 | 1.30 | I: 6; II: 1 | I: 2 |
| Embodiment 3 | 1.10 | 10.00 | 9.11 | 2.5 ± 2 | 1.30 | 0.75 | 8.00 | 10.71 | 9 ± 2 | 1.30 | I: 7 | I: 2 |
| Embodiment 4 | 2.11 | 15.00 | 7.12 | 2.5 ± 2 | 1.30 | 0.98 | 10.00 | 10.20 | 9 ± 2 | 1.30 | I: 7 | I: 2 |
| Embodiment 5 | 7.70 | 50.00 | 6.49 | 2.5 ± 2 | 1.30 | 4.68 | 30.00 | 6.41 | 9 ± 2 | 1.30 | I: 6; II: 1 | I: 2 |
| Comparing Embodiment 1 | 0.88 | 8.00 | 9.11 | 2.5 ± 2 | 1.30 | 0.98 | 10.00 | 10.20 | 9 ± 2 | 1.30 | II: 4; III: 3 | I: 2 |
| Comparing Embodiment 2 | 0.75 | 6.80 | 9.11 | 2.5 ± 2 | 1.30 | 0.75 | 8.00 | 10.71 | 9 ± 2 | 1.30 | II: 5; III: 2 | I: 2 |

TABLE 2

Battery Module Parameters and Performance Test Results

| | First-Type Battery Cell | | | | | Second-Type Battery Cell | | | | | Electrical Performance of Battery Module Lithium plating Level Judgment | |
|---|---|---|---|---|---|---|---|---|---|---|---|---|
| | | | | Slope k1 of SOC-OCV Curve in Interval of 5%-95% (mV/% SOC) | | | | | Slope k2 of SOC-OCV Curve in Interval of 5%-95% (mV/% SOC) | | Number of Lithium plating Levels in First-Type Battery Cell | Number of Lithium plating Levels in Second-Type Battery Cell |
| Number | M1 | Conductivity mS/cm | CW mg/cm² | | PD g/cm³ | M2 | Conductivity mS/cm | CW mg/cm² | | PD g/cm³ | | |
| Embodiment 6 | 1.10 | 10.00 | 9.11 | 2.5 ± 2 | 3.00 | 0.75 | 8.00 | 10.71 | 9 ± 2 | 3.00 | II: 7 | II: 2 |
| Embodiment 7 | 1.10 | 10.00 | 9.11 | 2.5 ± 2 | 3.00 | 0.75 | 8.00 | 10.71 | 9 ± 2 | 1.30 | II: 7 | I: 2 |
| Embodiment 3 | 1.10 | 10.00 | 9.11 | 2.5 ± 2 | 1.30 | 0.75 | 8.00 | 10.71 | 9 ± 2 | 1.30 | I: 7 | I: 2 |
| Embodiment 8 | 1.10 | 10.00 | 9.11 | 2.5 ± 2 | 1.00 | 0.75 | 8.00 | 10.71 | 9 ± 2 | 1.00 | I: 6; II: 1 | I: 2 |
| Embodiment 9 | 1.10 | 10.00 | 9.11 | 2.5 ± 2 | 0.80 | 0.75 | 8.00 | 10.71 | 9 ± 2 | 0.60 | I: 6; II: 1 | I: 2 |

TABLE 3

Battery Module Parameters and Performance Test Results

| | First-Type Battery Cell | | | | | Second-Type Battery Cell | | | | | Electrical Performance of Battery Module Lithium plating Level Judgment | |
|---|---|---|---|---|---|---|---|---|---|---|---|---|
| | | | | Slope k1 of SOC-OCV Curve in Interval of 5%-95% (mV/% SOC) | | | | | Slope k2 of SOC-OCV Curve in Interval of 5%-95% (mV/% SOC) | | Number of Lithium plating Levels in First-Type Battery Cell | Number of Lithium plating Levels in Second-Type Battery Cell |
| Number | M1 | Conductivity mS/cm | CW mg/cm² | | PD g/cm³ | M2 | Conductivity mS/cm | CW mg/cm² | | PD g/cm³ | | |
| Embodiment 10 | 1.54 | 10 | 6.49 | 2.5 ± 2 | 1.30 | 0.83 | 8 | 9.70 | 9 ± 2 | 1.30 | I: 7 | I: 2 |
| Embodiment 3 | 1.10 | 10 | 9.11 | 2.5 ± 2 | 1.30 | 0.75 | 8 | 10.71 | 9 ± 2 | 1.30 | I: 7 | I: 2 |
| Embodiment 11 | 0.64 | 10 | 15.56 | 2.5 ± 2 | 1.30 | 0.49 | 8 | 16.23 | 9 ± 2 | 1.30 | I: 4; II: 3 | I:1; II:1 |

TABLE 4

Battery Module Parameters and Performance Test Results

| | First-Type Battery Cell | | | | | Second-Type Battery Cell | | | | | Electrical Performance of Battery Module | |
| --- | --- | --- | --- | --- | --- | --- | --- | --- | --- | --- | --- | --- |
| | | | | Slope k1 of | | | | | Slope k2 of | | Lithium plating Level Judgment | |
| | | | | Curve in Interval of 5%-95% (mV/ | | | | | Curve in Interval of 5%-95% (mV/ | | Number of Lithium plating Levels in First-Type | Number of Lithium plating Levels in Second-Type |
| Number | M1 | Conductivity mS/cm | CW mg/cm$^2$ | %SOC) Curve in | PD g/cm$^3$ | M2 | Conductivity mS/cm | CW mg/cm$^2$ | % SOC) Curve in | PD g/cm$^3$ | Battery Cell Number of | Battery Cell Number of |
| Embodiment 12 | 1.10 | 10 | 9.11 | 2.5 ± 2 | 1.30 | 0.75 | 8 | 10.71 | 11.5 ± 2 | 1.30 | I: 7 | I: 2 |
| Embodiment 3 | 1.10 | 10 | 9.11 | 2.5 ± 2 | 1.30 | 0.75 | 8 | 10.71 | 9 ± 2 | 1.30 | I: 7 | I: 2 |
| Embodiment 13 | 1.10 | 10 | 9.11 | 2.5 ± 2 | 1.30 | 0.75 | 8 | 10.71 | 6 ± 2 | 1.30 | I: 6; II: 1 | I: 2 |

It can be seen from Table 2 that in the battery module of embodiments 3, and 6~9, on the basis that the first battery cell and the second battery cell satisfy: M1>M2, and 0.08≤M1≤11, 0.03≤M2≤4.62, a compacted density PD1 of the first negative electrode plate and a compacted density PD2 of the second negative electrode plate further satisfy: when PD1≤PD2, and 0.5≤PD1≤3, 0.5≤PD2≤3 (unit is g/cm$^3$), active substance particles in the negative electrode plate of the first battery cell and the second battery cell are closely packed and maintain a certain ion diffusion path, which can ensure higher volumetric energy density of the battery module, while respective lithium plating windows of the first battery cell and the second battery cell are large, which can effectively reduce a risk of lithium plating during a fast charging process.

It can be seen from Table 3 that in the battery module of embodiments 3, 10, and 11, on the basis that the first battery cell and the second battery cell satisfy: M1>M2, and 0.08≤M1≤11, 0.03≤M2≤4.62, a coating mass per unit area CW1 of the first negative electrode plate and a coating mass per unit area CW2 of the second negative electrode plate further satisfy: when 6.49≤CW1≤17, 4.54≤CW2≤25.51 (unit: mg/cm$^2$). On one hand, a thicknesses of a negative active substance layer in the first battery cell and the second battery cell can be controlled to increase internal reaction uniformity of the negative active substance layer, reduce polarization of an active substance layer, and improve respective dynamical characteristics of the first battery cell and the second battery cell; on the other hand, energy density of the battery cell and the module may be ensured to be higher to reduce a manufacturing cost of the battery cell per watt hour.

It can be seen from Table 4 that in the battery module of embodiments 3, 12, and 13, on the basis that the first battery cell and the second battery cell satisfy: M1>M2, and 0.08≤M1≤11, 0.03≤M2≤4.62, when a state of charge-open circuit voltage (SOC-OCV) curve of the second battery cell further satisfies k2≥6 mV/% SOC, safety performance of the battery module during a fast charging process may be further optimized, so that the first-type battery cell is not prone to lithium plating and other safety problems.

Each embodiment or implementation in this specification is described in a progressive manner, each embodiment focuses on the differences from other embodiments, and the same or similar parts between the various embodiments can be referred to each other.

In the description of the present specification, the description of reference terms "one embodiment", "some embodiments", "an exemplary embodiment", "an example", "a specific example", "some examples", or the like refers to a particular feature, structure, material or characteristic described in combination with the embodiment or example included in at least one embodiment or example of the present application. In the present specification, schematic expressions of the foregoing terms do not necessarily refer to the same embodiment or example. Moreover, the particular feature, structure, material, or characteristic described may be combined in a suitable manner in any one or more embodiments or examples.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, and such modifications and replacements will not make the nature of the corresponding technical solutions depart from the scope of the embodiments of the present application.

What is claimed is:

1. A battery module, comprising a first-type battery cell and a second-type battery cell electrically connected at least in series, the first-type battery cell and the second-type battery cell are battery cells of different chemical systems,
the first-type battery cell comprises N first battery cell(s),
the second-type battery cell comprises M second battery cell(s), N and M are positive integers,
the first battery cell comprises a first negative electrode plate, the second battery cell comprises a second negative electrode plate,
a ratio of a conductivity of an electrolyte solution at 25° C. of the first battery cell to a coating mass per unit area of the first negative electrode plate is denoted as M1, a ratio of a conductivity of an electrolyte solution at 25° C. of the second battery cell to a coating mass per unit area of the second negative electrode plate is denoted as M2, wherein a unit of the conductivity of the electrolyte solution is mS/cm, a unit of the coating mass per unit area is mg/cm$^2$; and
M1 and M2 satisfy: M1>M2, and 0.08≤M1≤11, 0.03≤M2≤4.62.

2. The battery module according to claim 1, wherein $0.33 \leq M1 \leq 6.42$, $0.17 \leq M2 \leq 2.57$; and optionally, $0.63 \leq M1 \leq 1.94$, $0.63 \leq M2 \leq 1.1$.

3. The battery module according to claim 1, wherein a state of charge-open circuit voltage (SOC-OCV) curve of the first battery cell satisfies at least one of the following conditions:
   (1) in an interval of 5%-95% SOC, a slope k1 of the SOC-OCV curve of the first battery cell is $\leq 5$ mV/% SOC;
   (2) in the SOC-OCV curve of the first battery cell, there is at least a flat curve with a span not less than 10% SOC and the slope $k1 \leq 5$ mV/% SOC.

4. The battery module according to claim 1, wherein a state of charge-open circuit voltage (SOC-OCV) curve of the second battery cell satisfies at least one of the following conditions:
   (1) in the interval of 5%-95% SOC, a slope k2 of the SOC-OCV curve of the second battery cell is >5 mV/% SOC, optionally, $k2 \geq 6$ mV % SOC, and further optionally, $k2 \geq 9$ mV/% SOC;
   (2) in the SOC-OCV curve of the second battery cell, there is at least a curve with a span not less than 10% SOC and the slope k2>5 mV/% SOC.

5. The battery module according to claim 1, wherein a compacted density of the first negative electrode plate is PD1, a compacted density of the second negative electrode plate is PD2, wherein PD1<PD2, and $0.5 \leq PD1 \leq 3$, $0.5 \leq PD2 \leq 3$, and a unit is g/cm$^3$;
   optionally, $1 \leq PD1 \leq 2$, $1 \leq PD2 \leq 2$; and
   further optionally, $1.2 \leq PD1 \leq 1.7$, $1.2 \leq PD2 \leq 1.7$.

6. The battery module according to claim 1, wherein a coating mass per unit area of the first negative electrode plate is CW1, a coating mass per unit area of the second negative electrode plate is CW2, wherein $6.49 \leq CW1 \leq 17$, $4.54 \leq CW2 \leq 25.51$, and a unit is: mg/cm$^2$;
   optionally, $1 \leq CW1 \leq 2$, $1 \leq CW2 \leq 2$;
   further optionally, $9.09 \leq CW1 \leq 11.04$, $7.73 \leq CW2 \leq 12.69$; and
   still further optionally, CW1<CW2.

7. The battery module according to claim 1, wherein
   a negative active substance of the first negative electrical sheet and a negative active substance of the second negative electrical sheet can be independently selected from one or more of artificial graphite, natural graphite, soft carbon, hard carbon, silicon-based material, tin-based material and lithium titanate.

8. The battery module according to claim 1, wherein
   a ratio of the number N of the first battery cell to the number M of the second battery cell is 0.1~50, optionally 0.3~30, and further optionally 0.5~10.

9. A battery pack, comprising the battery module according to claim 1.

10. A power consumption apparatus, comprising the battery module according to claim 1, and the battery module can serve as a power supply or an energy storage unit of the power consumption apparatus.

* * * * *